Aug. 15, 1961 H. P. WRIGHT 2,996,687

VARIABLE ULTRASONIC DELAY LINE

Filed Aug. 26, 1959 2 Sheets-Sheet 1

INVENTOR
HOLDEN P. WRIGHT

BY *Lindsey and Prutzman*
ATTORNEYS

VARIABLE ULTRASONIC DELAY LINE

Filed Aug. 26, 1959 2 Sheets-Sheet 2

INVENTOR
HOLDEN P. WRIGHT

BY Lindsey and Prutzman
ATTORNEYS

United States Patent Office 2,996,687
Patented Aug. 15, 1961

2,996,687
VARIABLE ULTRASONIC DELAY LINE

Holden P. Wright, Bolton, Conn., assignor to Andersen Laboratories, Inc., West Hartford, Conn., a corporation of Connecticut Filed Aug. 26, 1959, Ser. No. 836,119
11 Claims. (Cl. 333—30)

The present invention relates to delay lines of the type wherein an acoustically suitable material is disposed between input and output transducers to introduce a time delay into the circuit containing the delay line and is concerned more particularly with an improved adjustable delay line which permits variation and adjustment in the length of transmission time between the input and output transducers.

It is an object of this invention to provide an improved delay line exhibiting greater time delays with a wider range of variation in time delay available by adjustment than heretofore obtainable with easily available standard transmission media.

It is a further object of this invention to provide an improved ultrasonic delay line having a greater rate of change of time delay for a given increment of adjustment.

It is an additional object of this invention to provide an improved ultrasonic delay line which is exceptionally compact for a given maximum of time delay and range of adjustment and is light in weight, rugged, reliable and accurate.

It is an additional object of this invention to provide an adjustable ultrasonic delay line which utilizes only fixed electrical connections so as to reduce the electrical complexity of the device and render the electrical parameters of the delay line substantially constant throughout the full range of adjustment.

It is a still further object of this invention to provide an ultrasonic delay line having a constant transmitted energy aperture thereby to provide exceptionally uniform response levels throughout the full range of adjustment.

It is still another object of this invention to provide an adjustable ultrasonic delay line which reduces spurious energy responses by collating the transmitted energy within the transmission medium.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

Figures 3, 4:
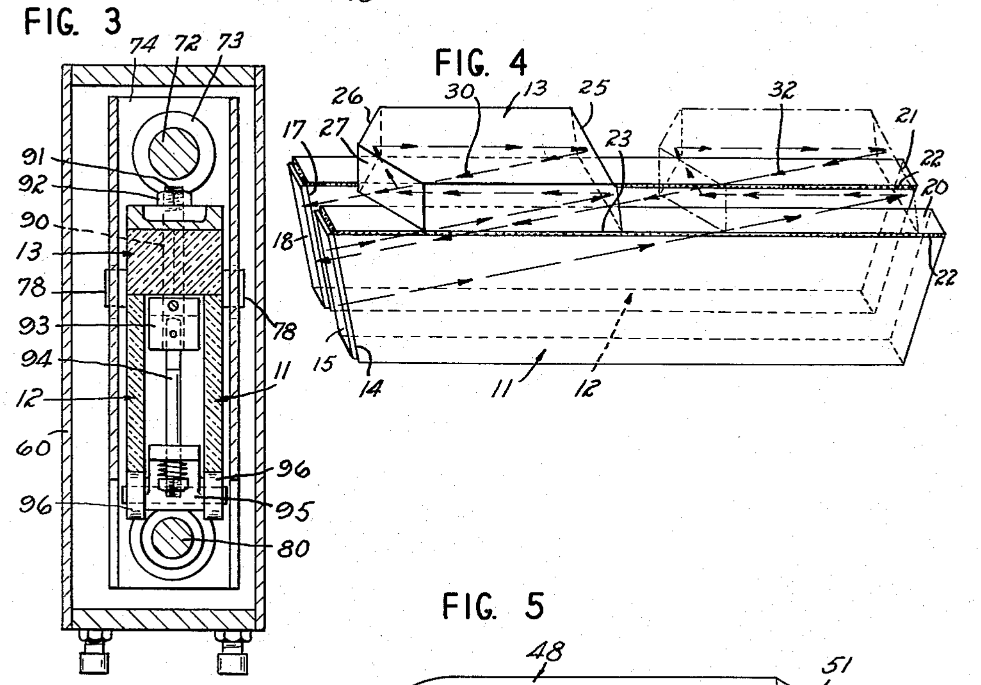
FIG. 3 is a cross section view taken along the lines 3—3 of FIG. 1.
FIG. 4 is a perspective view of the delay line elements of a preferred embodiment of my invention.

Referring first to FIG. 4, it is seen that a preferred embodiment of my invention generally comprises a pair of parallel spaced apart bars 11 and 12 which are acoustically coupled by the coupling member 13. The bars and coupling member are made of acoustically suitable material such as quartz, alloys such as Invar, etc. The bar 11 is provided with an inclined face 14 to which is attached a quartz crystal or similar transducing material 15. Bar 12 is also provided with an inclined face 17 to which is affixed the crystal 18 in a manner similar to that utilized for crystal 15. Assuming crystal 15 to be the input crystal, it is noted that the bar 11 provides a first delay medium path whose signal is coupled or transmitted to the second delay medium path in bar 12 by the ultrasonic bridge or coupling member 13 so that crystal 18 receives the delayed signal.

To facilitate transmission of the ultrasonic energy between bars 11 and 12 and coupling member 13, bar 11 is provided with a substantially flat longitudinal coupling surface 20 which intersects the path of energy propagation and bar 12 is provided with a similar surface 21 to which is applied a thin layer or film 22 of an unctuous material such as petroleum jelly or a similar material which is viscous and flowable. The bottom surface of coupling member 13 is provided with a coupling surface in engagement with bars 11 and 12 which may take the form of a flat surface 23 overlying and engaging the coupling surfaces 20 and 21. As hereinafter explained, the bars 11 and 12 are supported so as to be in fixed spaced apart parallel relationship and disposed generally side by side so that coupling member 13 is movable along the coupling surfaces 20 and 21.

In order to transfer the energy from input transducer or crystal 15 to output transducer or crystal 18, coupling member 13 is provided with a plurality of angularly related energy reflecting faces 25, 26 and 27. Reflecting face 25 is generally flat and tilted slightly towards the crystals 15 and 18 so that energy traveling within coupling member 13 in a direction parallel to coupling surface 23 is reflected along a line generally perpendicular to the crystals 15 and 18, and vice versa. Reflecting faces 26 and 27 are substantially perpendicular to coupling faces 20 and 21 and to each other. In addition, they are positioned relative to face 25 so that energy traveling parallel to the coupling faces and towards the face 27 impinges upon that face at an angle of substantially 45°. Because faces 26 and 27 are mutually perpendicular, it follows that energy reflected from face 27 impinges upon face 26 at an angle of substantially 45°. The angle of incidence is quite critical since it has been found that mode conversion takes place when the angle varies by more than a few minutes from 45°.

Referring now particularly to the solid line position of FIG. 4, it is noted that the path traced by the arrows 30 shows that energy leaving crystal 15 is transmitted outwardly therefrom along a line perpendicular thereto through the bar 11 and into the coupling member 13 through the juxtaposed coupling faces 20 and 23 and the unctuous material 22. Upon hitting the reflecting face 25, the energy is reflected back along a line which is generally parallel to coupling face 20 to strike reflecting face 27. The energy is then reflected to face 26 and is reversed in direction until it again hits face 25, whereupon it is reflected back through coupling surfaces 23 and 21 and unctuous material 22 to engage output crystal 18. As disclosed and claimed in issued U.S. Patent No. 2,659,053, Johnson, assigned to the assignee of the present invention, the use of an unctuous material between the flat coupling faces of the relatively movable members permits energy transmission between the movable members without undesirable distortion, reflection, and attenuation. Thus, the coupling member 13 can be moved, as for example, to the dotted line position of FIG. 4, so as to increase the delay time without undesirably affecting the transmitted signal. The signal path traced by arrows 32 has the same general configuration as previously described for arrows 30 illustrating the signal path when member 13 is in the solid line position with the exception that a longer path is provided between crystals 15 and 18. Thus, a coupling member 13 can be adjustedly positioned along coupling faces 20 and 21 to provide the desired time delay.

It is to be noted that my improved invention, because it simultaneously varies the length of the path within both bars 11 and 12, provides a substantially greater rate of change for a given velocity of adjustment of coupling member 13 than heretofore obtainable. In addition, it is believed that the various reflective faces within the coupling member 13 perform a collating function which tends to eliminate the presence of spurious signals in the transmitted energy received by crystal 18.

Figure 5:
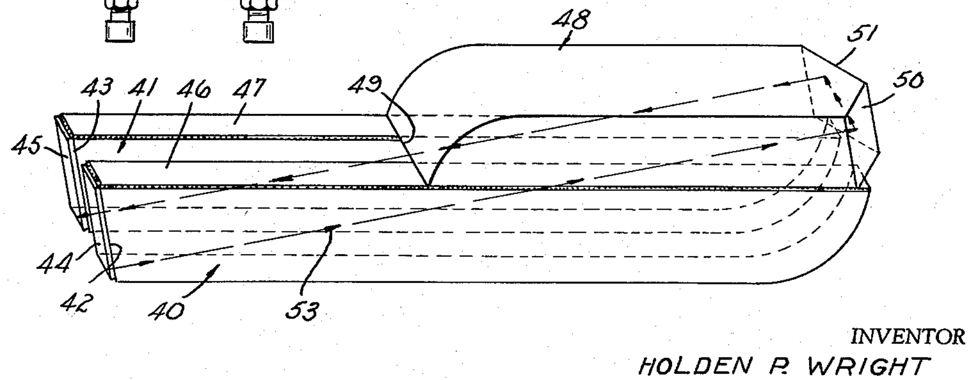
FIG. 5 is a perspective view of the delay line elements utilized in the second embodiment of my invention.

Turning now to the embodiment of FIG. 5, it is seen that a pair of spaced parallel bars 40 and 41 are provided with inclined faces 42 and 43 having input and output crystals 44 and 45 in a manner similar to that described for FIG. 4. In addition, bars 40 and 41 are provided with flat, generally coplanar coupling surfaces 46 and 47. Coupling member 48 is provided having generally flat surface 49 which overlies and engages the coupling surfaces 46 and 47. Unlike the embodiment of FIG. 4, coupling member 48 is provided with only two reflecting surfaces 50 and 51. The reflecting surfaces 50 and 51 bear the same 45° relationship to the transmitted signal and 90° relationship to each other as explained for the surfaces 26 and 27 of the embodiment of FIG. 4. In addition, the surfaces 50 and 51 are inclined towards the coupling surfaces 46 and 47 so that the energy from the crystal 44, schematically designated by the arrows 53, impinges upon the face 50 at the prescribed 45° angle and is reflected laterally across to face 51 whereupon it is reflected into bar 41 receiving crystal 45. The general operation and advantages of the delay line shown in FIG. 5 are substantially identical with that of FIG. 4.

It is very often desirable to obtain a constant level of signal response over the range of adjustment of the variable delay line and it is therefore necessary that the line have a constant signal aperture. As used herein, the term signal aperture refers to the dimensions (height and width) of the smallest effective reflecting area within the limits of movement accorded to the coupling member and the term effective reflecting area refers to that area of the reflecting surface upon which the transmitted energy impinges. The present invention provides a constant signal aperture by dimensioning the various reflecting surfaces so that they have equal effective areas which are less than the areas of the input and receiving transducers and by limiting movement of the coupling member so that the initial and final reflecting surfaces of the coupling member always face an equal or larger area of the input and receiving transducers. Thus, a substantially constant amplitude or level of signal energy is received by the receiving transducers throughout the range of coupling member movement. The advantages of a constant signal aperture for certain delay line uses far exceeds the disadvantage of providing delay line elements having the necessarily increased dimensions which permit the desired minimum aperture.

Although the fixed delay medium paths of the illustrated embodiments have been described as being within discrete bars, it is noted that such paths can be provided within a single delay medium element without departing from my invention.

Figure 1:
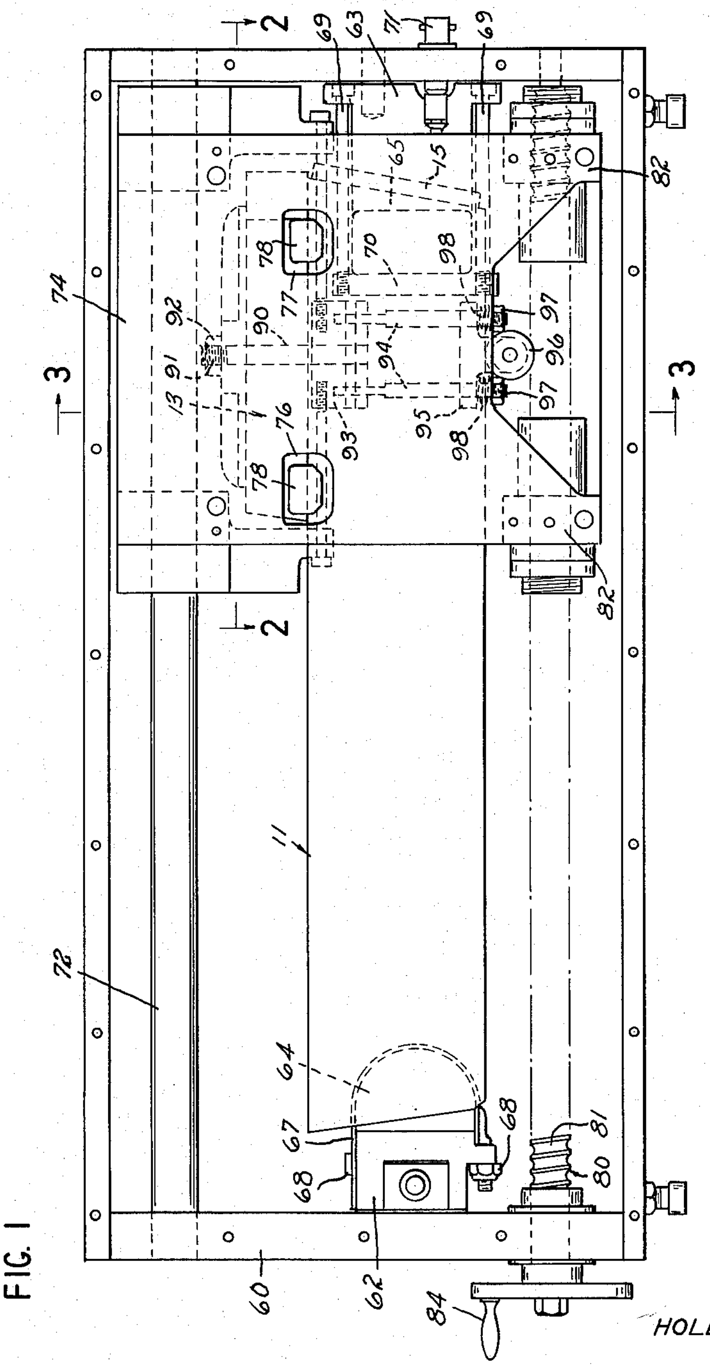
FIG. 1 is a side elevational view of a preferred embodiment of my invention.
Figure 2:
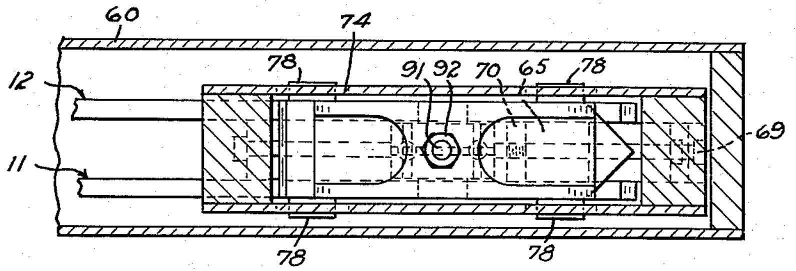
FIG. 2 is a partial cross section view of the embodiment of FIG. 1 taken generally along the lines 2—2 of FIG. 1.

It has been found that my improved delay line construction lends itself to a greatly improved and advantageous mounting and adjusting structure which is shown in FIGS. 1–3. This mounting structure is shown as supporting a delay line similar to that of the embodiment of FIG. 4 and similar numbers refer to similar parts. A generally rectangular frame 60 is provided with a first support abutment 62 and a second support abutment 63 which are adjacent the opposite ends of bars 11 and 12. The spacing between bars 11 and 12 and their positioning relative to each other are fixedly determined by a spacer block 64 (shown dotted in FIG. 1) and a spacer block 65 (shown dotted in FIG. 1) to which the bars are suitably fastened. In the preferred embodiment, the spacer blocks are made of the same material as the bars 11 and 12. A spring steel or similar metal strip 67 is wrapped around block 64 between bars 11 and 12 and is fastened to the abutment 62 by the fasteners 68. A pair of threaded fasteners 69 are embedded in the block 63 and engage a plate 70 to support and position the other end of bars 11 and 12. It is noted at this point that, because bars 11 and 12 are fixed in position, the input and output receiving crystals 15 and 18 are also fixed in position and can be rigidly wired to fixed terminals on the housing 60 such as terminal 71. This feature eliminates the necessity of having flexible coaxial conductors engaging a movable element and further, simplifies the problem of reducing inter-electrode capacitance between the crystals 15 and 18, their connections and the housing.

In order to guide the coupling member 13 for movement in a direction parallel to the bars 11 and 12, guide rod 72 is supported by the end walls of frame 60 and passes through the bearings 73 (one of which is shown in FIG. 3) in bracket 74. Bracket 74 extends down the outsides of bars 11 and 12 and is provided with side apertures 76 and 77 to accept projections 78 affixed to the outside of coupling member 13. As most clearly seen in FIG. 3, projections 78 extend slightly below bottom surface 23 so as to provide guides which engage the sides of bars 11 and 12. Controlled longitudinal movement of coupling member 13 is provided by screw 80 which is journalled for rotation at its ends in the frame 60. Although only a portion of the threads 81 are shown, it is to be understood that these threads extend throughout the length of the screw 80 and are engaged by nuts which are trapped and fixedly held by the downwardly extending ends 82 of the bracket 74. Thus, rotation of hand crank 84 causes movement of bracket 74 and coupling member 13 back and forth along the coupling surfaces 20 and 21 of bars 11 and 12.

In order to assure proper energy transfer between the coupling surfaces 20 and 21 and the coupling member 13, it is essential that a constant and substantial clamping force be applied between the bars 11 and 12 and the coupling member 13. My improved construction greatly facilitates the application of balanced clamping pressure since the delay medium paths in bars 11 and 12 are separated and the energy transmission paths within coupling member 13 are displaced from its center. Thus, a central aperture 90 is provided in coupling member 13 through which is inserted a threaded fastener 91. The upper end of fastener 91 is provided with a nut 92 and the lower end is fastened to guide block 93. A pair of trolley suspension rods 94 are secured to block 93 and pass through trolley 95 having wheels 96 which engage the underside of the bars 11 and 12 in rolling contact. Nuts 97 are provided on the other end of rods 94 and a spring 98 is disposed between each nut 97 and trolley 95 so as to apply a resilient clamping pressure of the desired magnitude. It is thus noted that the clamping pressure is balanced between the bars 11 and 12, and the coupling member 13 can be more easily moved along the coupling surfaces because of the reduction in friction provided by the wheels 96. This support structure is exceptionally rugged, economical to manufacture, and provides reliable support and adjustment for the coupling member 13 as well as the bars 11 and 12. It is to be noted that the foregoing mounting structure can be utilized with equal facility for the embodiment of FIG. 5.

The provision of more than one adjacent pair of delay medium bars or paths will greatly lengthen the available time delay and the provision of an additional coupling element, engaging the bottom of adjacent pairs of bars, for example, so as not to interfere with the operation of a first coupling member permits ganging of the delay line elements of this invention so as to greatly expand the amount of time delay, ratio of change, etc.

From the foregoing description of the operation and structure of my invention, it is apparent that I have provided a greatly improved ultrasonic delay line which is compact, lightweight, reliable in operation, and which provides a wider range of adjustment, greater total delays, and a greater ratio of change to maximum delay.

As will be apparent to persons skilled in the art, various modifications and adaptations of the structure above described will become readily apparent without departure from the spirit and scope of the invention, the scope of which is defined in the appended claims.

I claim:

1. A variable ultrasonic delay line comprising means providing a first acoustical delay medium path, means providing a second acoustical delay medium path spaced from and generally parallel to said first path and having acoustical energy input means at one end thereof, a movable coupling element of acoustical delay medium material intersecting and movable along the first and second paths, said coupling element being provided with acoustical energy reflective surfaces operative to transfer the propagated energy from the first path to the second path without changing the mode of energy transmission, means for moving said coupling element along said delay medium paths thereby to vary the effective length of the delay line, and output means on the means facing the second delay medium path operative to remove the energy inserted by said input means.

2. An adjustable ultrasonic delay line comprising means forming a first acoustical delay medium path, means forming a second acoustical delay medium path spaced from and generally parallel to said first path and having acoustical energy input means at one end thereof, each said first and second delay path being provided with coplanar substantially flat coupling surface intersecting said paths, a movable coupling member constructed of acoustical delay medium material having a first substantially planar surface engaging the coplanar surfaces on said first and second delay media and having a pair of energy reflecting second faces positioned to reverse the direction of energy propagation within said coupling member without changing the mode of energy transmission, and means to effect energy removal from said second path.

3. An adjustable ultrasonic delay line comprising means forming a first acoustical delay medium path, means forming a second acoustical delay medium path spaced from and generally parallel to said first path, said means forming first and second delay paths being provided with coplanar substantially flat coupling surfaces, an acoustical energy input transducer affixed to one end of the means forming the first delay medium path and inclined slightly towards the coupling surface on said first path, an output transducer affixed to the means forming the second delay path on the end thereof generally adjacent said input transducer, said output transducer being inclined towards the coupling surface of said second path, a movable coupling member constructed of acoustical delay medium material and having a surface overlying and engaging the coplanar surfaces intersecting the first and second delay paths, said coupling member being provided with energy reflective surfaces operative to transfer the propagated energy from said first path to said second path and to reverse the direction of energy propagation without changing the mode of energy transmission, and means for sliding said coupling member along the coupling surface of the first and second delay medium paths thereby to adjust the effective length of the delay line.

4. The ultrasonic delay line as set forth in claim 3 wherein the means forming the first and second paths are discrete bars and said coupling member is mounted on said bars by means comprising an aperture in said coupling member having an axis that is perpendicular to and disposed between said coupling faces, a stud retained in said aperture and extending between said parallel bars, a carriage having a pair of rollers thereon in rolling contact with the underside of said bars, and means resiliently fastening said stud to said carriage to thereby exert a force tending to hold the coupling member in firm engagement with said coupling faces.

5. A variable ultrasonic delay line comprising means forming a first solid delay medium path for acoustical energy, means forming a second solid delay medium path for acoustical energy, spaced from and generally parallel to said first path and having an output transducer at one end thereof, an input transducer on the end of the means forming the first delay medium path adjacent said input transducer, said means forming first and second delay paths being provided with coplanar substantially flat coupling surfaces, said input and output transducers being inclined towards the respective coupling surfaces, and a movable coupling member constructed of acoustical delay medium material having a first reflective surface facing said input and output transducers and at a slight angle thereto and a second reflecting surface generally comprised of two reflecting faces disposed at 90° to each other and at a 45° angle to the direction of propagation of energy within said delay medium paths whereby input energy from said first path impinging upon said first reflective face is reflected to engage said second face and to re-engage said first reflective face thereafter to be directed towards said output transducer.

6. The ultrasonic delay line as set forth in claim 5 wherein said first and second reflective surfaces have a constant effective area that is less than the areas of the transducers thereby to provide a delay line having a constant signal aperture throughout the range of adjustment.

7. A variable ultrasonic delay line comprising means forming a first solid delay medium path for acoustical energy, means forming a second solid delay medium path for acoustical energy in spaced parallel relationship with the first path, said means forming the first and second paths being provided with coplanar substantially flat coupling surfaces, an input transducer affixed to the means forming the first path and inclined towards the coupling surface of the first path, an output transducer affixed to the means forming the second path, positioned at the end thereof adjacent said input transducer and inclined towards the coupling surface of the second path, a coupling member constructed of acoustical delay medium material, and means movably supporting said coupling member in overlying engagement with each of said coupling surfaces, said coupling member having a pair of reflecting faces at the end of said coupling member opposite to said transducers, said reflecting faces being at 45° angles to the direction of transmission of energy along the first and second paths and being inclined towards said coupling surfaces whereby energy from said input transducer is conducted through along first path into said coupling member to engage one of said 45° faces whereupon it is reflected without mode conversion towards said second 45° face to be directed towards said output transducer through said coupling member and along the second path.

8. The ultrasonic delay line as set forth in claim 7 wherein said reflecting faces have a constant effective area that is less than the areas of the transducers to provide a delay line having a constant aperture throughout the range of adjustment.

9. An adjustable ultrasonic delay line comprising a first solid bar of acoustical delay medium material, a second solid bar of acoustical delay medium material spaced from and parallel to said first bar, said bars having substantially flat coplanar coupling surfaces formed thereon, means on said first bar directing energy towards the coupling surface on said first bar, a movable coupling member constructed of delay medium material and having a surface overlying and engaging the coupling surfaces on said first and second bars, said coupling member being provided with energy reflective surfaces operative to transfer the energy propagated from said first bar to said second bar without changing the mode of energy transmission, means to slide said coupling member along the coupling surfaces on said first and second bars thereby to change the effective length of the delay line, and means on said second bar to remove the energy transferred thereto from said first bar.

10. The ultrasonic delay line as set forth in claim 9 wherein said coupling member is provided with an aperture whose axis is perpendicular to and disposed between said coupling surfaces, a stud retained in said aperture and extending between said first and second bars, a carriage having a pair of rollers thereon in rolling contact with the underside of said bars, and means resiliently fastening said stud to said carriage to thereby exert a force tending to hold the coupling member in firm engagement with said coupling surfaces.

11. The ultrasonic delay line as set forth in claim 9 wherein the energy reflective surfaces on said coupling member have a constant effective area that is less than the area of the means on said first bar for directing energy towards said first coupling surface and less than the area on the means on said second bar for removing energy therefrom.

References Cited in the file of this patent

UNITED STATES PATENTS

| | | |
|---|---|---|
| 2,437,067 | Bingley | Mar. 2, 1948 |
| 2,552,489 | Lawson | May 8, 1951 |
| 2,659,053 | Johnson | Nov. 10, 1953 |
| 2,753,528 | Ashby | July 3, 1956 |
| 2,768,356 | Van De Lindt | Oct. 23, 1956 |
| 2,781,494 | Geoghegan | Feb. 12, 1957 |